United States Patent [19]

Pearson

[11] Patent Number: 4,752,400
[45] Date of Patent: Jun. 21, 1988

[54] SEPARATION OF METALLIC AND CYANIDE IONS FROM ELECTROPLATING SOLUTIONS

[75] Inventor: Donald E. Pearson, Nashville, Tenn.

[73] Assignee: Viking Industries, Murfreesboro, Tenn.

[21] Appl. No.: 878,371

[22] Filed: Jun. 25, 1986

[51] Int. Cl.$^4$ .............................................. B01D 19/00
[52] U.S. Cl. .................................... 210/718; 210/750; 210/766; 210/904
[58] Field of Search ............... 210/718, 724, 726, 737, 210/750, 752, 766, 904, 912; 204/DIG. 13; 423/37, 81, 236, 377, 379

[56] References Cited

U.S. PATENT DOCUMENTS

| | | | |
|---|---|---|---|
| 897,735 | 9/1908 | Goldberg | 210/904 |
| 2,640,807 | 6/1953 | Rice | 210/904 |
| 3,592,586 | 7/1971 | Scott | 210/904 |
| 4,321,145 | 3/1982 | Carlson | 210/904 |

Primary Examiner—Ivars Cintins
Attorney, Agent, or Firm—Kane, Dalsimer, Sullivan, Kurucz, Levy, Eisele and Richard

[57] ABSTRACT

A method of removal of cyanide and metal ions from electroplating waste waters is described. The cyanide, as hydrogen cyanide, is purged with air and then absorbed efficiently in 1.5% sodium hydroxide solution. The purge is effected by dispersing air bubbles in the waste water after adjusting the pH of the water to one within the range of from 4 to 6.5. The cyanide ions are converted to hydrogen cyanide and entrained in the air bubbles for transport to a separate vessel for absorbtion in the sodium hydroxide solution. The apparatus employed is a closed system to avoid the hazards associated with hydrogen cyanide.

10 Claims, No Drawings

SEPARATION OF METALLIC AND CYANIDE IONS FROM ELECTROPLATING SOLUTIONS

BACKGROUND OF THE INVENTION

1. Field of the Invention

The invention relates to the purification of waste water and more particularly relates to methods of removing cyanide and metal ions from aqueous solutions.

2. Brief Description of the Prior Art

Electroplating wastes present a variety of problems in the design and operation of efficient waste water treatment systems. A major difficulty results from the use of strong metal complex formers in the aqueous plating baths, the most widely used being cyanides; see Durney, L. J., *Electroplating Engineering Handbook*, Van Nostrand Reinhold Co., Inc., New York, N.Y., 4th Edition, 1984.

The removal of cyanides is of primary concern since cyanide itself is toxic and, due to its complexing ability, interferes with the removal of metals as well; see Nemerow, N. L., *Industrial Water Pollution*, Addison-Wesley, Inc., Reading, Mass., 1978.

In theory, cyanides may be removed by conversion to cyanates or $CO_2$ and $N_2$ (total destruction), or by distillation. Although a variety of researchers have demonstrated the ability of ozone, hydrogen peroxide and polysulfides for destruction or conversion and ion exchange for removal, the practical method of choice for cyanide removal has remained chlorine treatment; see for example Nemerow, supra., and Cherry, K. F., *Plating Waste Treatment*, Ann Arbor Science, Inc., Ann Arbor, Mich., 1982.

Removal of cyanides by distillation has not gained widespread acceptance in industrial practice, nor is it used to remove metal cations. Representative of this method of cyanide removal is the description given in the U.S. Pat. No. 3,744,977.

The present invention offers improvements and advantages over the prior art methods for removing cyanide and metallic ions from solution in water. The method of the invention comprises a waste water recovery process which exhibits many advantages over traditional cyanide destruction processes currently in use. These advantages include:

1. More complete removal and separation of cyanide from metal cations; the latter in turn being more efficiently removed in the uncomplexed form.
2. No addition of sodium or calcium ions to the waste water from hypochlorite since hypochlorite is not used. Also, no sodium chloride from the product of hypochlorite reaction.
3. Recovered alkali metal cyanide is reuseable.
4. The waste water need not be boiled for removal of hydrogen cyanide.

Other advantages of the method of the invention will be appreciated by those skilled in the art from the following description.

SUMMARY OF THE INVENTION

The invention comprises a method of removing hydrogen cyanide from an aqueous solution thereof, which comprises; entraining the hydrogen cyanide in a gas dispersed in the solution; and separating the gas with the entrained hydrogen cyanide from the solution. After removal of the cyanide, the residue metal cations may be removed by conventional methods, for example by conversion to the solid hydroxides and sulfides and filtration of the solid products.

The method of the invention is highly cost effective and may be carried out with minimal capital expenditure.

DETAILED DESCRIPTION OF THE PREFERRED EMBODIMENTS OF THE INVENTION

The method of the invention may be employed to remove cyanide from any aqueous solution, but is particularly advantageous in the treatment of electroplating waste water which also contains metal ions such as nickel, cadmium, copper, calcium, chromium, zinc, iron and like cations.

The method of the invention may be carried out simply by dispersing in the waste water undergoing treatment, a plurality of gas bubbles, preferably air bubbles, for the entrainment of dissolved hydrogen cyanide gas. The hydrogen cyanide may be formed in the water from cyanide ion present, by reaction with sulfuric acid. Advantageously, a 50 percent (V/V) sulfuric acid reagent is added to the water in sufficient quantity to obtain an acid pH in the range of from about 4 to 6.5.

Advantageously, the dispersion of air bubbles in the hydrogen cyanide containing water is maximized to efficiently entrain the dissolved hydrogen cyanide gas. Dispersers of fritted glass may be added to the water undergoing treatment.

The time required for entrainment of substantially all of the cyanide, in the form of hydrogen cyanide, is of course dependent on a number of factors including the quantity to be removed, the temperature of the water, the atmospheric pressure under which entrainment is carried out and the volume of air dispersed into the water. In general, higher temperatures and air volumes speed the removal as does a lower pressure.

Advantageously, the method of the invention is carried out at a temperature below reflux temperature for any given pressure. Preferably, the method is conducted at a temperature of from about 50° C. to about 99° C., most preferably circa 80° C.

Sub-atmospheric pressures facilitate carrying out the method of the invention at relatively low temperatures. Advantageously, pressures of from 700 to 500 mm Hg are used.

The hydrogen cyanide gas, entrained in the gas bubbles is preferably conducted in a closed system to a reactor vessel for reaction with sodium hydroxide. The reaction product, sodium cyanide may be safely recovered or used as recovered and is a valuable product.

The remaining water, particularly when it contains residues of metal cations, may be further treated to remove contaminants by conventional techniques. For example, an agent for precipitating the ions as components of a solid compound may be added to the residue solution. Thus, the water may be neutralized to a pH of circa 7.0, and treated with sodium hydroxide or sodium sulfide to precipitate the metal hydroxides and sulfides.

The following examples describe the manner and the process of making and using the invention and set forth the best mode contemplated by the inventor for carrying out the invention. Sodium cyanide (low, PPM concentrations) determinations were carried out by the Hach pyridine-pyrazolone method (Hach Co. Chemical Procedures Explained, Hach, P.O. Box 389, Loveland, Colo. 80539). High concentrations of sodium cyanide (fractions of a gram) were determined by silver nitrate titration in the presence of potassium iodide and ammonia (method of Kolthoff, I. M., Sandell, E. B., Meehan, E. J., Bruckenstein, S., Quantitative Chemical Analysis, MacMillan, London, p. 811, 1969).

PREPARATION

Reagent Solutions:
1. 2.0230 g. of $NiCl_2 6H_2O$ and 3.1546 g. of sodium cyanide with water made up to 500 ml. in a volumetric flask.
2. 1.8336 g. of $CuSO_4$ (anhydrous) and 2.3106 g. of sodium cyanide with water made up to 500 ml.
3. 0.7597 of $CaCl_2$ and 1.5705 g. of sodium cyanide made up to 250 ml.
4. 1.3564 g. of $ZNSO_4 \cdot 7H_2$) and 2.5677 g. of sodium cyanide with water made up to 250 ml.
5. 1.0071 g. $Fe(NO_3)_3$ and 2.8601 g. sodium cyanide with water made up to 250 ml.

Aliquots of each of the above were taken to make up from 0.1 to 0.2 g. of sodium cyanide solutions. The exact amounts of sodium cyanide are given in Table I, below. The solutions were then made up to 100 ml. with tap water and the resulting solutions mixed together.

EXAMPLE 1

A reflux vessel as described by Fisher Scientific Co. (Fisher Scientific Co., W/W 80, Procedures and Test Equipment for Water/Wastewater analysis, p. 34) was provided and charged with 100 ml. of the metal-cyanide reagent Preparation described above. Air dispersers of fritted glass (medium grade were added and a slow stream of air was passed through the charged solution. With the air stream passing through the solution by applying a small suction from water aspirator, the solution was acidified cautiously with 1 ml. of 50% V/V sulfuric acid in water by introduction of the acid via a thistle tube leading to bottom of flask containing waste solution. The above precautions mitigated against the escape of hydrogen cyanide. The solution was then heated. Heating took about 20 minutes to reflux temperature and reflux continued for another 20 minutes. Hydrogen cyanide gas was evolved (distilled) from the solution. The hydrogen cyanide was carried over into a disperser, the fine bubbles from which pass through a solution of 1.5% aqueous sodium hydroxide. The hydrogen cyanide captured as sodium cyanide was then analyzed. A second trap was used at first but no hydrogen cyanide was found in the second trap. So, it was abandoned. However if gas flow rates are higher, it may be necessary to have a second trap.

The solution residue with cyanide removed was adjusted to pH 7-7.5, first with solid sodium hydroxide and as the pH 7 is approached (slight gel-like precipitate forms) by dropwise addition of 1.5% sodium hydroxide. The total volume was about 110 ml. One to 2 ml. of $Na_2S$ stock solution was added and the mixture allowed to stand for at least three hours or overnight. It was then filtered using cellulose or Perlite filter aid and the filtrate analyzed for metal ion using a Perkin-Elmer, AA 403. with standard operating conditions. The analytical results are shown in Table 1 below.

EXAMPLE 2

The procedure of Example 1, supra., was repeated except that the charged solution was heated to a temperature of 80° C. The analytical results are given in the Table 1, below.

TABLE I

| Metal Salt Present in Filtrate | SODIUM CYANIDE COLLECTED | |
|---|---|---|
| | Theor. NaCN Recoverable (mg) | NaCN Found (mg) |
| Example 1 (Under Reflux) | | |
| 0.0 Cu (ppm) 0.3 Ni 1.8 Fe 0.17 Cd 0.0 Zn | 0.116 | 0.122 |
| Example 2 (At 80° C.) | | |
| | 0.110 | 0.116 |

EXAMPLE 3 (NaOCL)

Not an example of the invention, but made for comparision purposes. The exact mixture treated in Examples 1 and 2 above was also treated with twice the theoretical amount of sodium hypochlorite solution to convert all the cyanide to cyanate anion. It was then treated with 1 to 2 ml. of $Na_2S$ stock added and the mixture stood overnight. Analytical results are given in the following Table II.

TABLE II

| Metal Salt Present in Filtrate | Sodium Cyanide in Filtrate |
|---|---|
| 0.64 Cu (ppm) 1.75 Ni 8.4 Fe 5.0 Cd 0.54 Zn | 0.30 ppm |

Removal of sodium cyanide by distillation or purging gave smaller amounts of each of the metals and of cyanide in the filtrate to be discarded.

EXAMPLE 4

Work-up of Industrial Cadmium Waste Water (1 gallon) by Distillation Method.

| | |
|---|---|
| $Cd^{++}$ in waste: | 492 ppm. |
| Recovered: | 8.4 g of pure sodium cyanide in 70 g of sodium hydroxide and 0.57 l. of water. |
| Recovered: | 14 g of dried Cd sludge, mostly CdS. |
| Disposed: | 4.94 l. of water containing 140 g of sodium sulfate, 0.6 ppm $Cd^{++}$, and 0.5 ppm of sodium cyanide |

As will be appreciated by the skilled artisan, the distillation method is expensive if the water is allowed to reflux. We estimate about 32,000 calories are used to purge hydrogen cyanide from 100 g of water held at reflux for 20 minutes. However, if water is held at 80° C. and a good disperser of air (medium glass frit) is used, the hydrogen cyanide is removed expending only about 6,000 calories per 100 g of waste water.

What is claimed is:
1. A method of removing hydrogen cyanide from an aqueous solution thereof, which comprises;
providing the solution at a pH of from about 4 to 6.5;
disperseing gas bubbles in the provided solution;
entraining the dissolved hydrogen cyanide in the dispersed gas bubbles while said bubbles are dispersed in the provided solution;
removing the gas bubbles with entrained hydrogen cyanide from the provided solution; and
separating the entrained hydrogen cyanide from the gas bubbles;
said method being carried out in a closed system under a sub-atmospheric pressure of from 700 to 500 mm Hg and at a temperature below the reflux temperature of the provided solution.

2. The method of claim 1 wherein the temperature is within the range of from about 50° C. to about 90° C.

3. The method of claim 2 wherein the temperature is about 80° C.

4. The method of claim 1 wherein the aqueous solution contains metal cations associated with electroplating waste water.

5. The method of claim 1 which further comprises converting the entrained hydrogen cyanide to an alkali metal cyanide or to a complex.

6. The method of claim 1 wherein the gas is air.

7. A method of removing cyanide and metallic ions selected from the group consisting of copper, nickel, iron, cadmium and zinc ions, from an electroplating aqueous solution, which comprises;

adding a mineral acid to the solution in a proportion sufficient to adjust the pH of the solution to one of from about 4 to 6.5, whereby there is formed hydrogen cyanide in the solution, from the cyanide ions and the acid;
heating the acid solution to a temperature below the reflux temperature of the solution;
dispersing in the heated solution a plurality of air bubbles, whereby the hydrogen cyanide, dissolved in the heated solution is removed from solution by entrainment in the air bubbles;
separating the air bubbles containing entrained hydrogen cyanide from the heated solution; and
treating the solution after separation of the air bubbles to precipitate the metal ions;
said metal being carried out in a system closed off from the atmosphere, under a sub-atmospheric pressure of from 700 to 500 mm. Hg.

8. The method of claim 7 wherein heating is to a temperature within the range of from above room temperature to just below the boiling point of water.

9. The method of claim 8 wherein the temperature is within the range of from about 50° C. to about 90° C.

10. The method of claim 9 wherein the temperature is about 80° C.

* * * * *